July 14, 1931.  I. D. CANTRELL  1,813,989
SAW FILER'S GAUGE
Filed March 24, 1930
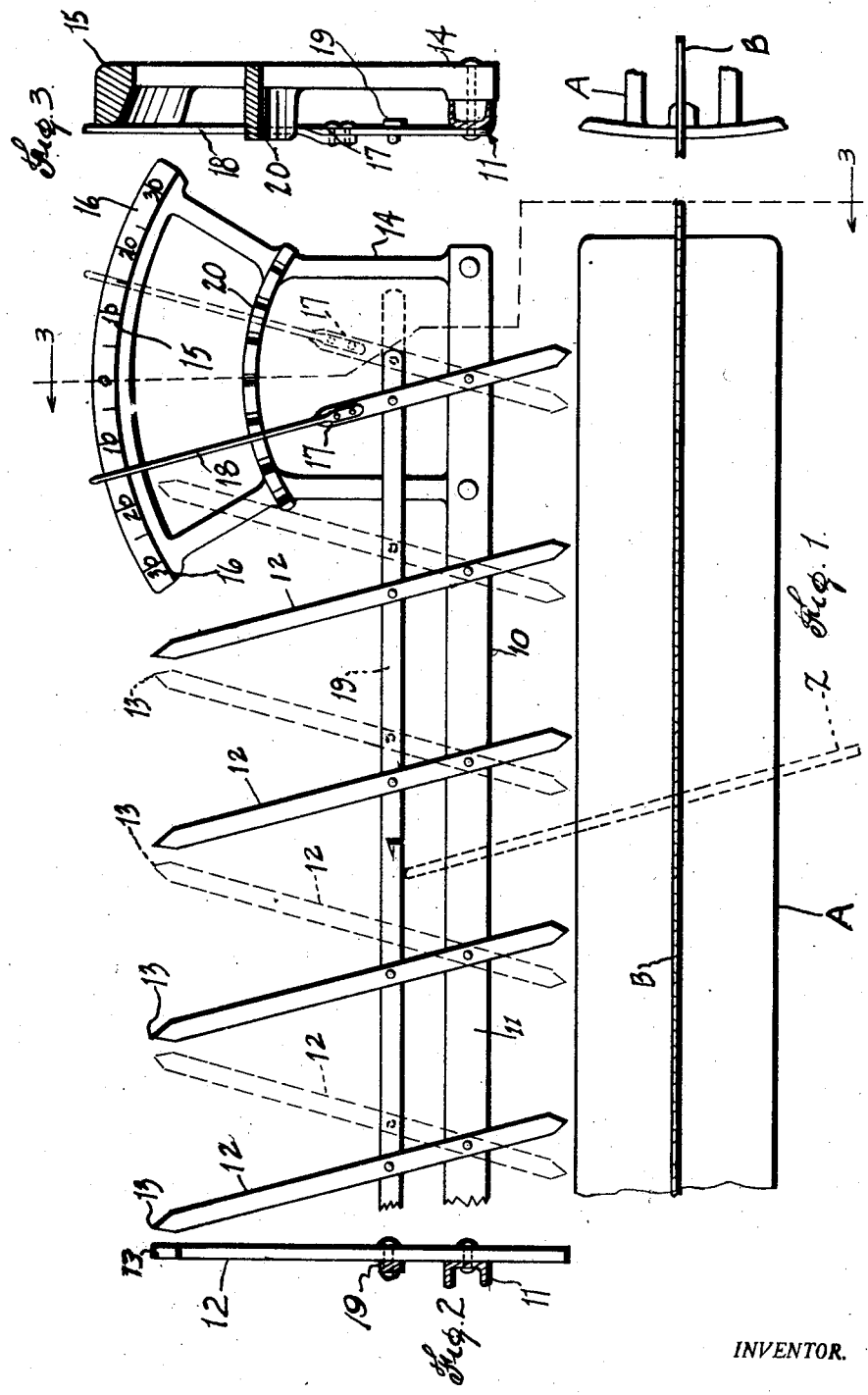
INVENTOR.
Isaac D. Cantrell Patented July 14, 1931

1,813,989

UNITED STATES PATENT OFFICE

ISAAC D. CANTRELL, OF DALLAS, TEXAS

SAW FILER'S GAUGE

Application filed March 24, 1930. Serial No. 438,475.

This invention appertains to certain novel, serviceable and advantageous improvements in a device for aiding saw filers to file saws accurately and symmetrically and in such connection the invention relates more particularly to a saw filer's guide.

The invention contemplates a fixed guide to be preferably fixed or set near or adjacent to a suitable saw clamp or vise, said guide provided with suitable means to direct the accurate and even filing of the saw teeth.

An important purpose of the invention is to provide a saw filer's guide, that is equipped with a plurality of suitable guide fingers, said guide fingers fixed to be moved in unison. The provision of a plurality of guide fingers affording an easy guide for the various points along the saw that is to be filed.

Another object of the invention is to produce a device of the type described that may be easily and quickly set at the desired angle or bevel and also one that will remain fixed or set at the preferable place until purposely reset by hand.

A particular object of the invention is to produce a saw filer's guide embodying all of the aforementioned features, one that will be nominal in cost and positive of operation, of extremely simple and durable structure and be most efficient for all of the purposes intended.

A construction designed to effectuate the invention will be hereinafter described together with other novel features of the invention.

The invention will be more readily comprehended from a perusal of the following detailed specification and by reference to the accompanying drawings, in which an exemplification of the invention is depicted, and wherein:

Figure 1 is a top plan view of the saw filer's guide, constructed in accordance with my invention, a portion being broken away;

Figure 2 is an end view of the same, and

Figure 3 is a sectional view taken on the line 3—3 of Figure 1.

In the drawings, wherein like characters of reference are employed to designate corresponding parts or portions throughout the several views, the reference number 10 refers to the saw filer's guide shown in its entirety. The guide is suitably positioned or fixed adjacent or near a preferable saw clamp or vise A holding an ordinary hand saw B. It is obvious that any kind of saw may be secured in the vise.

The guide consists of a channel iron frame bar 11 having a plurality of movable finger strips 12 pivoted at their lower portions to said frame bar. The ends of the finger strips, preferably the upper ends, may be pointed at 13. However, the finger strips may be rounded, cut at a bevel or cut straight across as best suits the occasion.

At the end of the guide is suitably mounted an indicator frame 14, having an indicator 15 at its upper portion. The indicator is provided with suitable indicia 16, such as numbers indicating different degrees of angle, to which various saws must be filed. The finger strip that is nearest the indicator 15, is cut at 17 and a stub wire gauge needle 18 is riveted onto the strip, adapted to pass over the indicator. A lever connecting bar or strip 19, to which each finger strip is pivoted above where the strips are pivoted to the frame bar 11. It is obvious, that by this arrangement all of the finger strips will move in unison.

A notched segment 20 is provided intermediate the frame bar 10 and the indicator 15. The gauge needle is positioned to ride over and bear against the notched segment 20. It is apparent that as the gauge needle 18 is of resilient nature, the same is held securely in the desired notch of the segment 20, until moved by hand. By referring to Figure 1 of the drawings, it will be seen that the user's file Z, shown in dotted lines, will have a uniform angularity during the filing of the entire length of the saw. However, if an unusually long saw, band saw or the like is filed, the saw may be moved progressively along in the saw clamp A.

Manifestly, various changes in the size and shape of the different parts as well as modifications and alterations may be made within the spirit of the invention and the scope of the appended claim.

Having described my invention and explained its uses and operation, what I claim for my invention and desire broadly covered and protected by United States Letters Patent is:

In a saw filer's guide, a frame having a segment dial provided with indicia, a plurality of guide fingers pivotally mounted on said frame, an indicator means pivotally mounted on said frame and cooperating with said dial to indicate the angular position of the former, means connecting said indicator means to said fingers so that they move as a unit, said frame having means adapted to hold said indicator means and fingers in any desired position.

ISAAC D. CANTRELL.